United States Patent
Mau et al.

(10) Patent No.: US 9,274,550 B2
(45) Date of Patent: Mar. 1, 2016

(54) HINGE, SUPPORTING MODULE HAVING THE HINGE, AND DISPLAY DEVICE HAVING THE SUPPORTING MODULE

(71) Applicants: LITE-ON ELECTRONICS (GUANGZHOU) LIMITED, Guangzhou (CN); LITE-ON TECHNOLOGY CORP., Taipei (TW)

(72) Inventors: Shu-Hua Mau, Taipei (TW); Yue-Wen Jiang, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 417 days.

(21) Appl. No.: 13/845,352

(22) Filed: Mar. 18, 2013

(65) Prior Publication Data

US 2014/0063750 A1   Mar. 6, 2014

(30) Foreign Application Priority Data

Aug. 30, 2012   (CN) .......................... 2012 1 0319273

(51) Int. Cl.

| G06F 1/16 | (2006.01) |
|---|---|
| F16M 11/10 | (2006.01) |
| F16M 11/20 | (2006.01) |
| E05D 11/08 | (2006.01) |
| E05D 11/10 | (2006.01) |

(52) U.S. Cl.
CPC ............ *G06F 1/1601* (2013.01); *E05D 11/087* (2013.01); *E05D 11/1028* (2013.01); *F16M 11/10* (2013.01); *F16M 11/2021* (2013.01); *G06F 1/16* (2013.01); *E05D 2011/1035* (2013.01); *E05Y 2900/606* (2013.01); *F16M 2200/024* (2013.01); *F16M 2200/041* (2013.01); *Y10T 16/54038* (2015.01)

(58) Field of Classification Search
CPC ................................. G06F 1/16; G06F 1/1601
USPC ................ 361/681, 679.27; 16/354, 339, 342
See application file for complete search history.

(56) References Cited

U.S. PATENT DOCUMENTS

| 6,154,925 A * | 12/2000 | Miura .............................. 16/338 |
| 7,147,191 B2 * | 12/2006 | Ichikawa et al. .......... 248/292.12 |
| 7,431,254 B2 * | 10/2008 | Cheng ...................... 248/292.12 |
| 7,597,302 B2 * | 10/2009 | Lee ......................... F16M 11/04 248/157 |
| 7,967,273 B2 * | 6/2011 | Zhou ...................... F16M 11/04 248/176.3 |
| 8,196,875 B2 * | 6/2012 | Lien et al. ..................... 248/121 |
| 2012/0248048 A1 * | 10/2012 | Wu et al. ........................ 211/26 |

\* cited by examiner

*Primary Examiner* — Dion R Ferguson
*Assistant Examiner* — Mandeep S Buttar
(74) *Attorney, Agent, or Firm* — Rosenberg, Klein & Lee

(57) ABSTRACT

A hinge for pivotally interconnecting first and second brackets includes a shaft having a shaft body extending through the first and second brackets and formed with an engaging end portion proximate to the second bracket, a fixing member connected to the engaging end portion, a ratchet sleeved rotatably on the shaft body between the fixing member and the second bracket, a friction mechanism having an urging unit sleeved on the shaft body between the ratchet and the fixing member and pressing the ratchet toward the second bracket, and a brake mechanism disposed on the second bracket and having a pawl member releasably engaged to the ratchet.

16 Claims, 8 Drawing Sheets

HINGE, SUPPORTING MODULE HAVING THE HINGE, AND DISPLAY DEVICE HAVING THE SUPPORTING MODULE

CROSS REFERENCE TO RELATED APPLICATION

This application claims priority of Chinese Patent Application No. 201210319273.3, filed on Aug. 30, 2012.

BACKGROUND OF THE INVENTION

1. Field of the Invention

The invention relates to a hinge, more particularly to a hinge that is capable of changing the magnitude of friction, a supporting module having the hinge, and a display device having the supporting module.

2. Description of the Related Art

User-friendly touch interface screens have a wide range of applications. The touch screen may be used as a display screen for viewing or as a control interface for press control by a user. A conventional support frame of a screen is usually configured as rotatable to facilitate adjustment of a viewing angle of the touch screen. However, a hinge of the current screen support frame can only provide one torque. If the setting of the torque value is low, when the touch screen is touched by a user, the screen is likely to move rearward because of the strong pressing force exerted by the user's finger on the screen, so that the screen is unstable. On the contrary, if the setting of the torque value is high, when the touch screen is adjusted by the user to a desired viewing angle or for storage, a rather laborious force must be exerted. Hence, use of the conventional support frame is inconvenient.

SUMMARY OF THE INVENTION

Therefore, an object of the present invention is to provide a hinge having a ratchet and a pawl member which can engage to and disengage from the ratchet so that the hinge can provide different frictional forces and rotational torques.

Another object of this invention is to provide a hinge that can provide a different frictional force when rotated to a different direction.

Accordingly, a hinge of this invention for pivotally interconnecting a first bracket and a second bracket includes a shaft, a fixing member, a ratchet, a friction mechanism, and a brake mechanism.

The shaft includes a shaft body adapted to extend through the first and second brackets in a left-right direction, a head portion formed on one end of the shaft body and adapted to be proximate to the first bracket, and an engaging end portion formed on the shaft body opposite to the head portion and adapted to be proximate to the second bracket. The shaft is adapted to permit rotation of the second bracket relative to the first bracket.

The fixing member is sleeved on the shaft body and is connected to the engaging end portion.

The ratchet is sleeved on the shaft body and is located between the fixing member and the second bracket.

The friction mechanism includes an urging unit that is sleeved on the shaft body between the ratchet and the fixing member and that presses the ratchet toward the second bracket.

The brake mechanism is adapted to be disposed on the second bracket and includes a pawl member releasably engaged to the ratchet.

Still another object of this invention is to provide a supporting module having a hinge. The hinge has a ratchet and a pawl member which can engage to and disengage from the ratchet so that the hinge can provide different frictional forces and rotational torques. When the pawl member is engaged to the ratchet, a large torque feedback is provided so that the supporting module can stably position a display module at a selected angular position.

Yet another object of this invention is to provide a supporting module having a hinge. When a second bracket is rotated in a rearward direction relative to a first bracket, the friction provided by the hinge is large, so that the supporting module can stably position a display module at a selected angular position. When the second bracket is rotated in a frontward direction, the friction provided by the hinge is small, thereby facilitating a user to rotate and adjust an angular position of the display module and storage of the same.

Accordingly, a supporting module of this invention for supporting a display module comprises a first bracket, a second bracket, and a hinge.

The first bracket includes a pivot lug which has opposite first and second sides.

The second bracket is adapted to be connected to the display module and has a pivot plate proximate to the pivot lug.

The hinge pivotally interconnects the pivot lug of the first bracket and the pivot plate of the second bracket. The hinge includes a shaft, a fixing member, a ratchet, a friction mechanism, and a brake mechanism.

The shaft includes a shaft body extending through the pivot lug of the first bracket and the pivot plate of the second bracket in a left-right direction, a head portion formed on one end of the shaft body and proximate to the pivot lug, and an engaging end portion formed on the shaft body opposite to the head portion and proximate to the pivot plate. The second bracket is rotatable about the shaft relative to the first bracket.

The fixing member is sleeved on the shaft body and is connected to the engaging end portion.

The ratchet is sleeved rotatably on the shaft body between the pivot plate of the second bracket and the fixing member.

The friction mechanism includes an urging unit that is sleeved on the shaft body between the ratchet and the fixing member and that presses the ratchet toward the second bracket.

The brake mechanism is disposed on the pivot plate of the second bracket and includes a pawl member releasably engaged to the ratchet. When the second bracket is rotated in a rearward direction relative to the first bracket, the pawl member engages and pushes the ratchet to rotate in the rearward direction. When the second bracket is rotated in a frontward direction, the ratchet stays motionless, and the pawl member disengages from the ratchet and moves along an outer peripheral edge of the ratchet.

Still yet another object of this invention is to provide a display device having a supporting module. When the display device rotates in a rearward direction, the friction provided by a hinge of the supporting module is large, so that the supporting module can stably position the display device at a selected angular position. When the display device is rotated in a frontward direction, the friction provided by the hinge of the supporting module is small, thereby facilitating a user to rotate and adjust an angular position of the display device and storage of the same.

Accordingly, a display device of this invention comprises a display module, a base seat, and a supporting module.

The base seat is adapted to be disposed on a surface. The supporting module is disposed between the display module and the base seat to support the display module on the base seat. The supporting module includes a first bracket, a second bracket, and a hinge. The first bracket includes a pivot lug having opposite first and second sides. The second bracket is fixed to the display module and includes a pivot plate proximate to the pivot lug.

The hinge pivotally interconnects the pivot lug of the first bracket and the pivot plate of the second bracket. The hinge includes a shaft, a fixing member, a ratchet, a friction mechanism, and a brake mechanism. The shaft includes a shaft body extending through the pivot lug of the first bracket and the pivot plate of the second bracket in a left-right direction, a head portion formed on one end of the shaft body and proximate to the pivot lug, and an engaging end portion formed on the shaft body opposite to the head portion and proximate to the pivot plate. The second bracket is rotatable about the shaft relative to the first bracket.

The fixing member is sleeved on the shaft body and is connected to the engaging end portion. The ratchet is sleeved rotatably on the shaft body between the fixing member and the pivot plate. The friction mechanism includes an urging unit that is sleeved on the shaft body between the ratchet and the fixing member and that presses the ratchet toward the pivot plate. The brake mechanism is disposed on the pivot plate and includes a pawl member releasably engaged to the ratchet. When the second bracket is rotated in a rearward direction relative to the first bracket, the pawl member engages and pushes the ratchet to rotate in the rearward direction. When the second bracket is rotated in a frontward direction, the ratchet stays motionless, and the pawl member disengages from the ratchet and moves along an outer peripheral edge of the ratchet.

The supporting module further includes a base bracket fixed to the base seat, and two pivots interconnecting the base bracket and the first bracket. The first bracket is rotatable about the pivots relative to the base bracket.

The first bracket includes two pivot lugs. The second bracket includes two pivot plates which are respectively proximate to the second sides of the pivot lugs. The supporting module further includes two hinges. Each of the hinges pivotally interconnects one of the pivot lugs of the first bracket and a respective one of the pivot plates of the second bracket.

The effect of this invention resides in that: Through the provision of the ratchet and the pawl member, when the hinge of the supporting module is rotated to a different direction, the friction provided by the hinge is different. Relatively, the rotational torque is also different.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The above-mentioned and other technical contents, features, and effects of this disclosure will be clearly presented from the following detailed description of one embodiment in coordination with the reference drawings.

Figure 1:
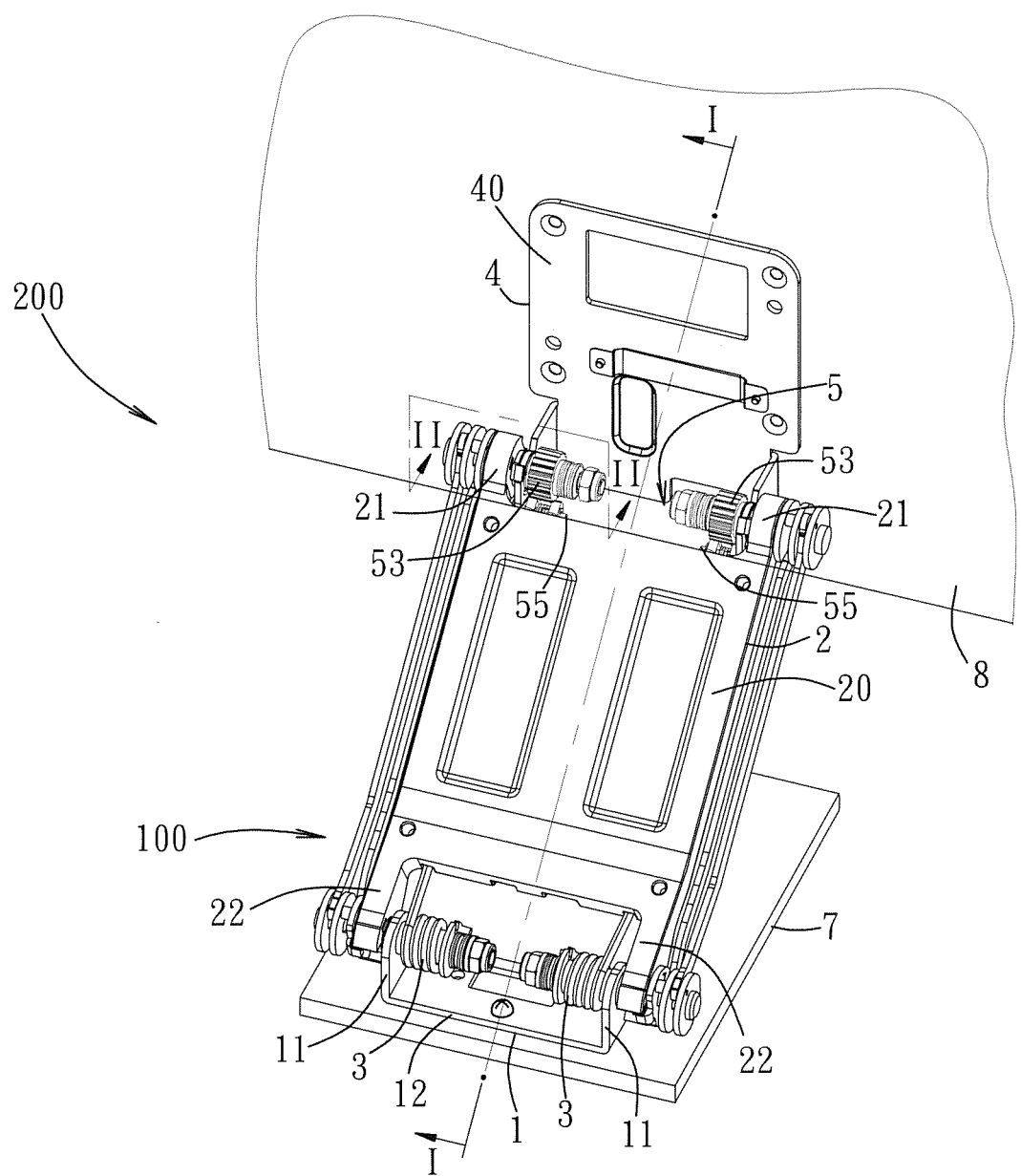
FIG. 1 is a fragmentary perspective view of a display device according to the preferred embodiment of this invention.
Figure 2:
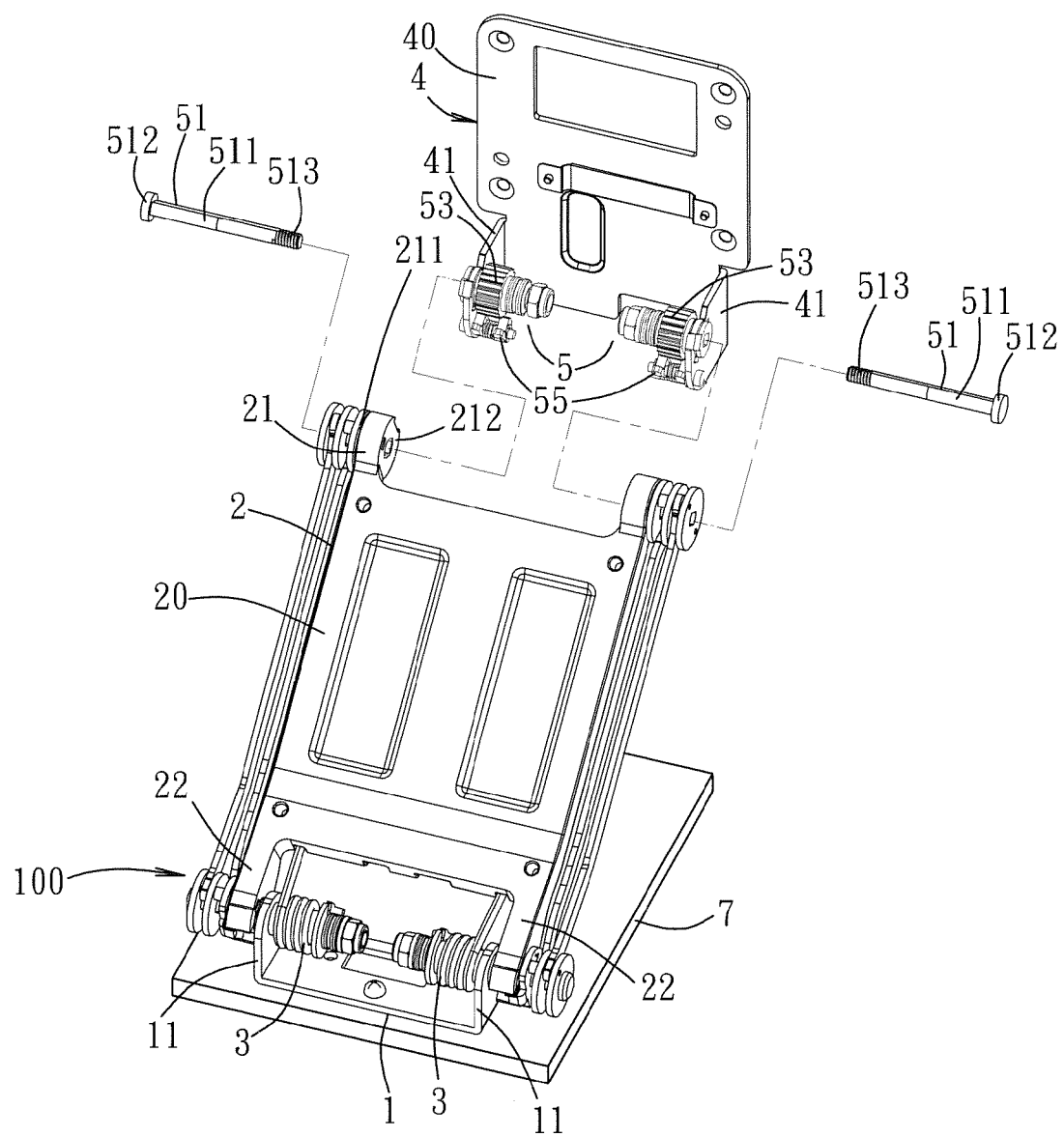
FIG. 2 is a partly exploded perspective view of a supporting module of the preferred embodiment.

Referring to FIGS. 1 and 2, a display device 200 according to the preferred embodiment of the present invention is shown to comprise a display module 8, a base seat 7 and a supporting module 100. The base seat 7 and the supporting module 100 cooperatively support a display module 8 on a surface, such as a table (not shown). In this embodiment, the display module 8 is exemplified as a flat touch screen, and the base seat 7 is a computer host which cooperates with the display module 8 and the supporting module 100 to form an all-in-one (AIO) desktop computer. The base seat 7 is adapted to be disposed on the surface which is approximately perpendicular to a vertical or rear surface of the display module 8. The supporting module 100 includes a base bracket 1, a first bracket 2, two pivots 3, a second bracket 4 and two hinges 5.

The base bracket 1 has a U-shape, and is fixed to the base seat 7 by using a fastener, such as a screw. The base bracket 1 includes a bight portion 12 screwed to the base seat 7, and two upright plates 11 extending upwardly from the bight portion 12 and spaced apart from each other along a left-right direction. The first bracket 2 includes a plate body 20, and two protrusions 22 protruding from a bottom end of the plate body 20 toward outer sides of the respective upright plates 11. Alternatively, the protrusions 22 may protrude toward inner sides of the respective upright plates 11. Each protrusion 22 is connected pivotally to the respective upright plate 11 through a respective one of the pivots 3. Through this configuration, the first bracket 2 is rotatable relative to the base bracket 1 through the pivots 3. It is worth to note that the connection between the base bracket 1 and the base seat 7 is not limited to the aforesaid disclosure. For example, the base bracket 1 and the base seat 7 may be integrally formed as one body or may be inter-engaged to each other. As long as the base bracket 1 and the base seat 7 may be interconnected, any type of connections is acceptable in this invention.

The first bracket 2 further includes two pivot lugs 21 protruding upwardly from a top end of the plate body 20 and spaced apart from each other along the left-right direction. Each of the pivot lugs 21 has opposite first and second sides 211, 212. The second bracket 4 includes a connecting plate 40 connected to the display module 8, and two pivot plates 41 extending transversely, rearwardly and respectively from left and right ends of the connecting plate 40 toward the first bracket 2. The connecting plate 40 is fixed to a rear surface of the display module 8 by using fasteners, such as screws. The pivot plates 41 are respectively proximate to the pivot lugs 21. In this embodiment, each pivot plate 41 is disposed in a side-by-side manner with the respective pivot lug 21 along the left-right direction, and is proximate to the second side 212 thereof. It should be noted that each pivot plate 41 may be located on the first side 211, and may be designed according to the requirement.

Figure 3:
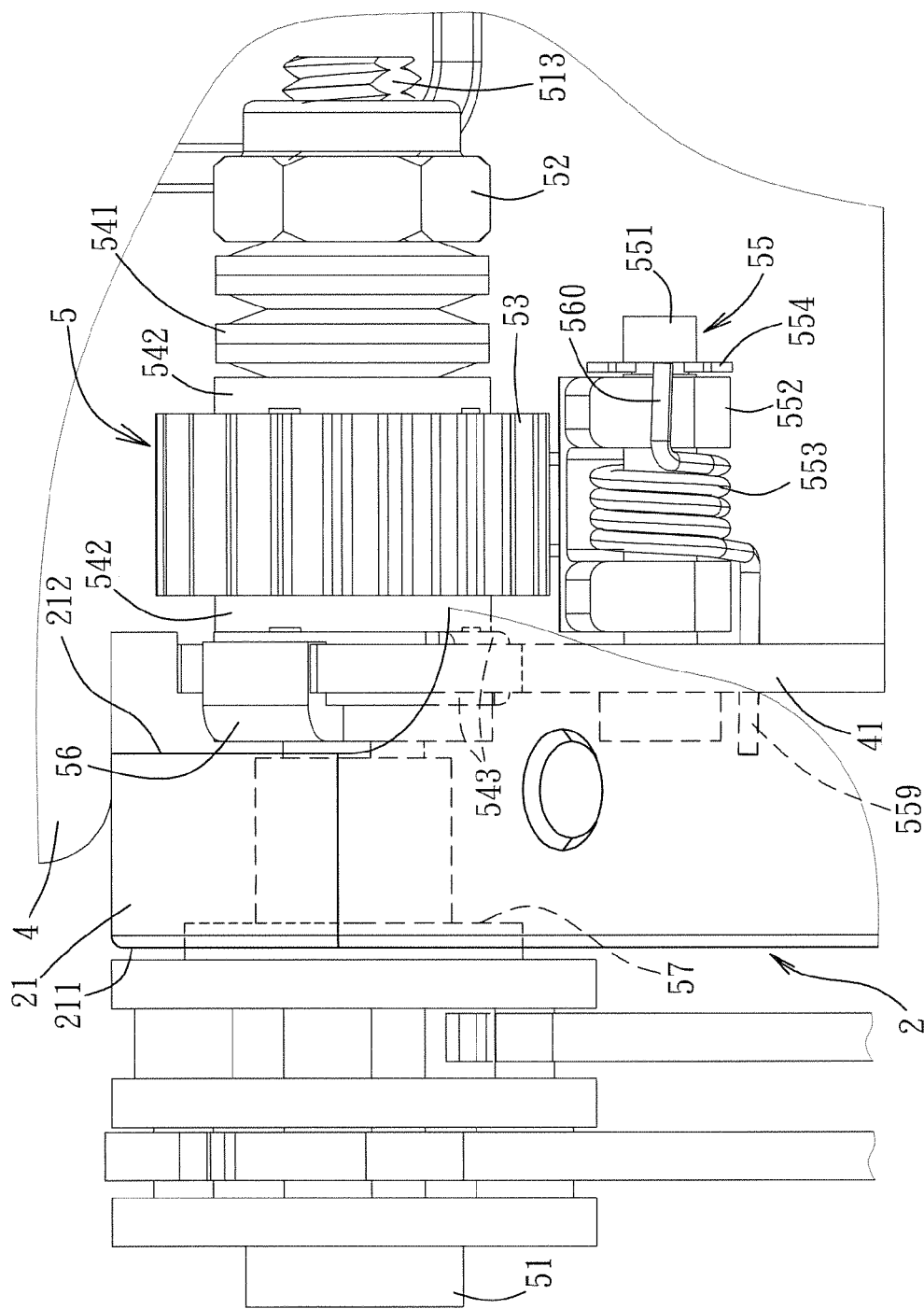
FIG. 3 is a fragmentary enlarged schematic view of the preferred embodiment, illustrating how a hinge interconnects a first bracket and a second bracket.
Figure 4:
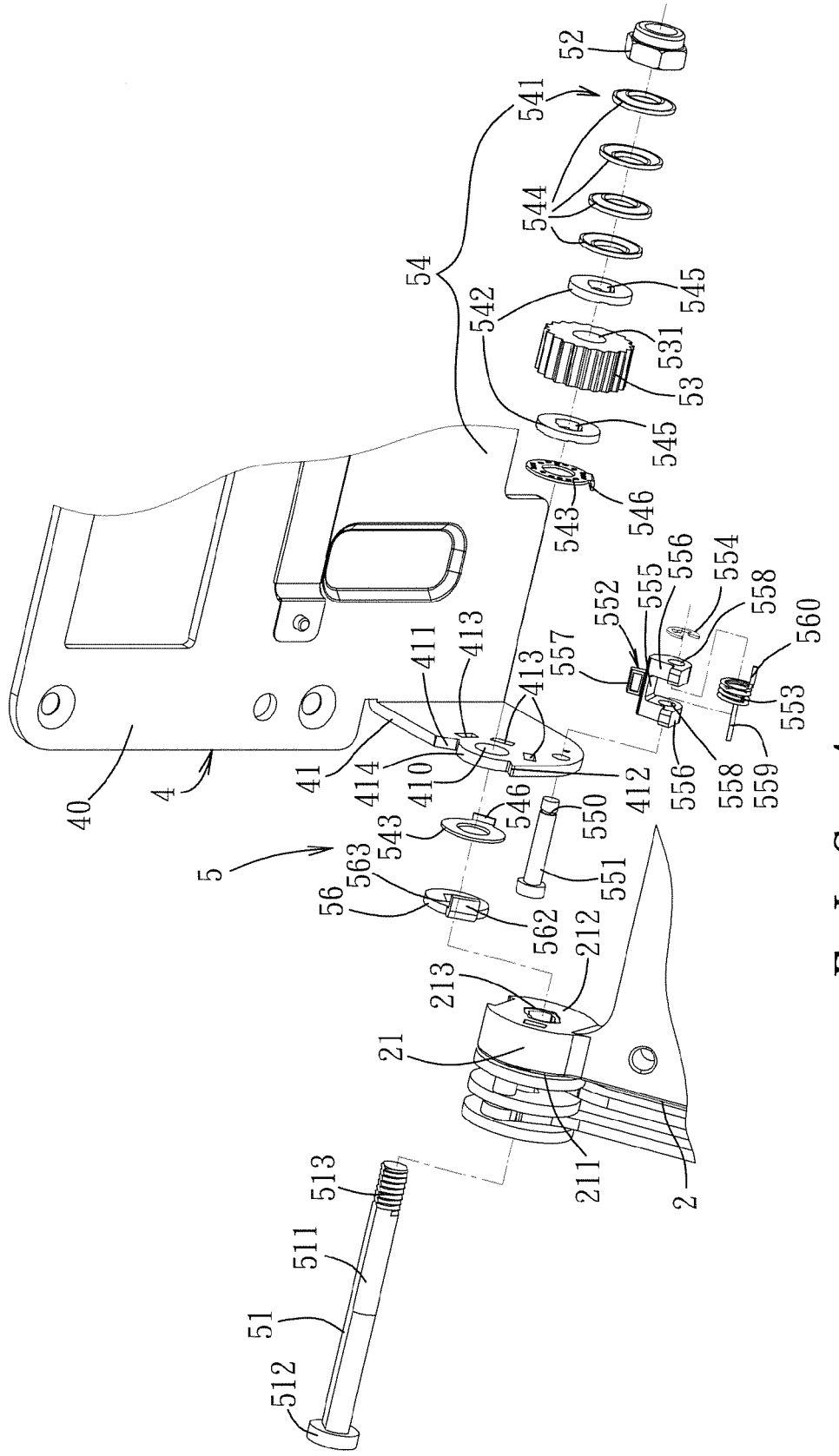
FIG. 4 is an exploded perspective view of the hinge of the preferred embodiment.
Figure 5:
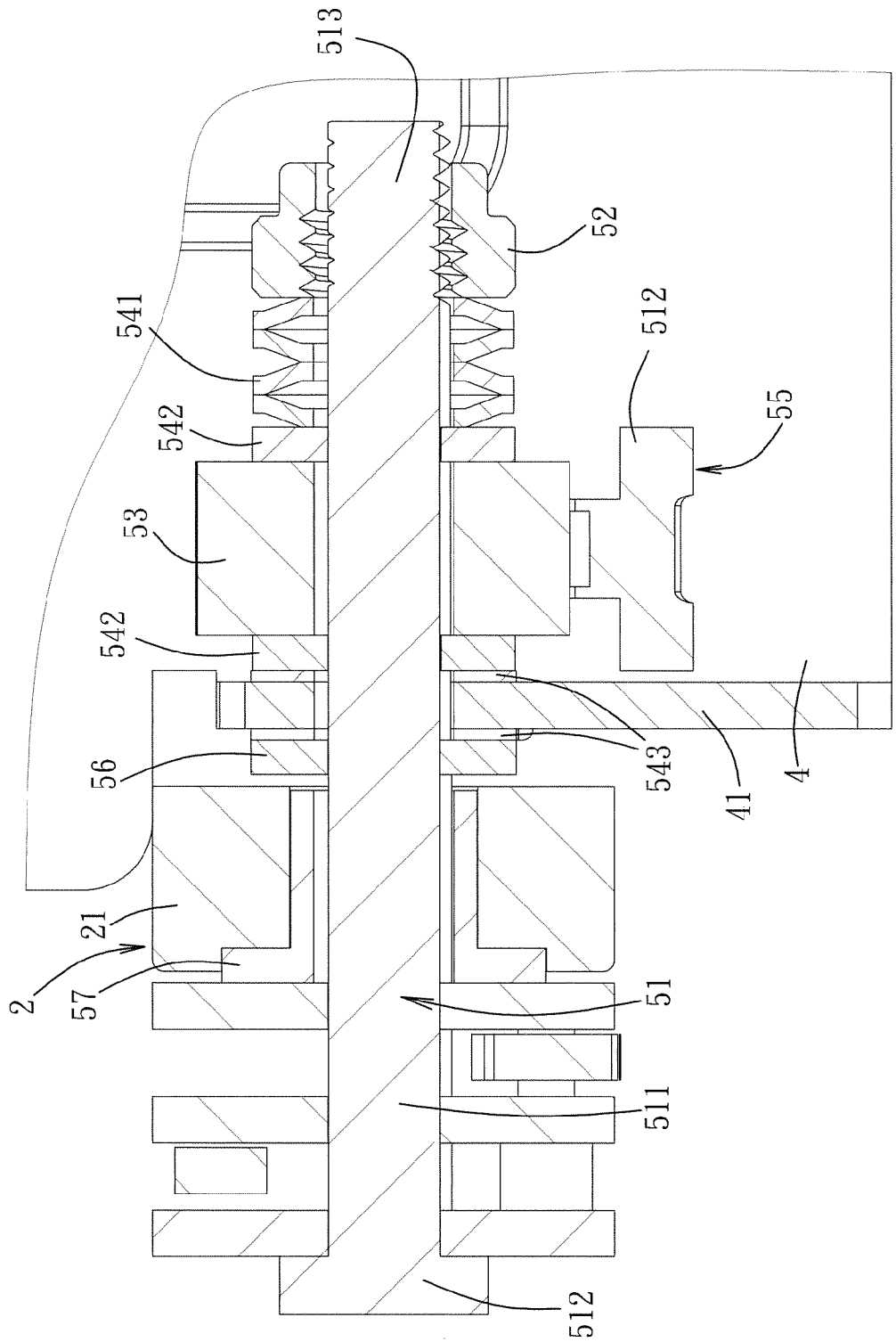
FIG. 5 is a sectional view of the preferred embodiment taken along line II-II of FIG. 1.

Referring to FIGS. 3 to 5, in combination with FIGS. 1 and 2, each of the hinges 5 pivotally connects one of the pivot plates 41 to the respective pivot lug 21. Through this configuration, the second bracket 4 is rotatable relative to the first bracket 2 through the hinges 5. Since the construction of each hinge 5 is symmetrical, only the hinge 5 that connects one of the pivot plates 41 to the respective pivot lug 41 will be described below.

The hinge 5 includes a shaft 51, a fixing member 52, a ratchet 53, a friction mechanism 54, a brake mechanism 55, a limiting plate 56 and a spacer 57.

The shaft 51 includes a shaft body 511, a head portion 512 formed on one end of the shaft body 511, and an engaging end portion 513 formed on the shaft body 511 opposite to the head portion 512. The shaft body 511 has a non-circular cross section. The pivot lug 21 is formed with a first pivot hole 213 having a non-circular cross section that corresponds to that of the shaft body 511. The shaft body 511 extends through the first pivot hole 213 in the pivot lug 21 and a second pivot hole 410 in the pivot plate 41 such that the head portion 512 of the shaft 51 is proximate to the pivot lug 21 and the engaging end portion 513 of the shaft 51 is proximate to the pivot plate 41. Through this configuration, the second bracket 4 is rotatable relative to the first bracket 2 about the shaft 51.

The fixing member 52 is sleeved on the shaft body 511 and is connected releasably to the engaging end portion 513. In this embodiment, the engaging end portion 513 has an external thread, and the fixing member 52 is configured as a nut that is engaged threadedly to the external thread. The ratchet 53 is sleeved on the shaft body 511 and is disposed between the pivot plate 41 and the fixing member 52.

The friction mechanism 54 includes an urging unit 541 sleeved on the shaft body 511 and disposed between the ratchet 53 and the fixing member 52. The fixing member 52 prevents detachment of the ratchet 53 and the urging unit 541 from the shaft body 511 when engaged to the engaging end portion 513 of the shaft 51. It should be noted herein that the connection between the fixing member 52 and the shaft 51 is not limited to the aforesaid disclosure. As long as the fixing member 52 and the shaft 51 can be interconnected, any type of connections is acceptable in this embodiment. The urging unit 541 in this embodiment includes four conical spring washers 544 sleeved on the shaft body 511 in an alternating manner. Such combination of the spring washers 544 acts as a spring. The spring washers 544 bias the ratchet 53 to move toward and press against the pivot plate 41. The number of the spring washers 544 is not limited to the aforesaid disclosure and may be varied depending on actual requirements.

Preferably, the friction mechanism 54 further includes two friction washers 542 and two stop washers 543. The friction washers 542 are sleeved on the shaft body 511 such that one of the friction washers 542 is disposed between and abuts against the ratchet 53 and the urging unit 541, while the other friction washer 542 is disposed between and abuts against the ratchet 53 and the pivot plate 41. Each friction washer 542 is formed with an engaging hole 545 having a non-circular shape corresponding to that of the shaft body 511 so that the shaft body 511 can engagingly extend therethrough. The ratchet 53 is formed with a circular through hole 531 so that the shaft body 511 can extend therethrough and the ratchet 53 is rotatable about the shaft body 511. When the ratchet 53 rotates relative to the shaft body 511, the friction washers 542 cannot rotate relative to the shaft body 511, and friction is generated between the friction washers 542 and the ratchet 53.

The stop washers 543 are sleeved on the shaft body 511 and are connected to two opposite sides of the pivot plate 41. The limiting plate 56 is sleeved on the shaft body 511 between the pivot lug 21 and the pivot plate 41. One of the stop washers 543 is disposed between and abuts against one of the friction washers 542 and an inner surface of the pivot plate 41, while the other stop washer 543 is disposed between and abuts against an outer surface of the pivot plate 41 and the limiting plate 56. The pivot plate 41 is further formed with three angularly spaced-apart through apertures 413 proximate to the second pivot hole 410. Each of the stop washers 543 includes an engaging tab 546 engaged to one of the through apertures 413. Through this configuration, the stop washers 543 can be fixed to the pivot plate 41. It is worth to note that the number of the through apertures 413 is not limited to three, and may be one, two or more. That is, the number of the through apertures 413 in the pivot plate 41 may be varied depending on actual requirements.

Figure 6:
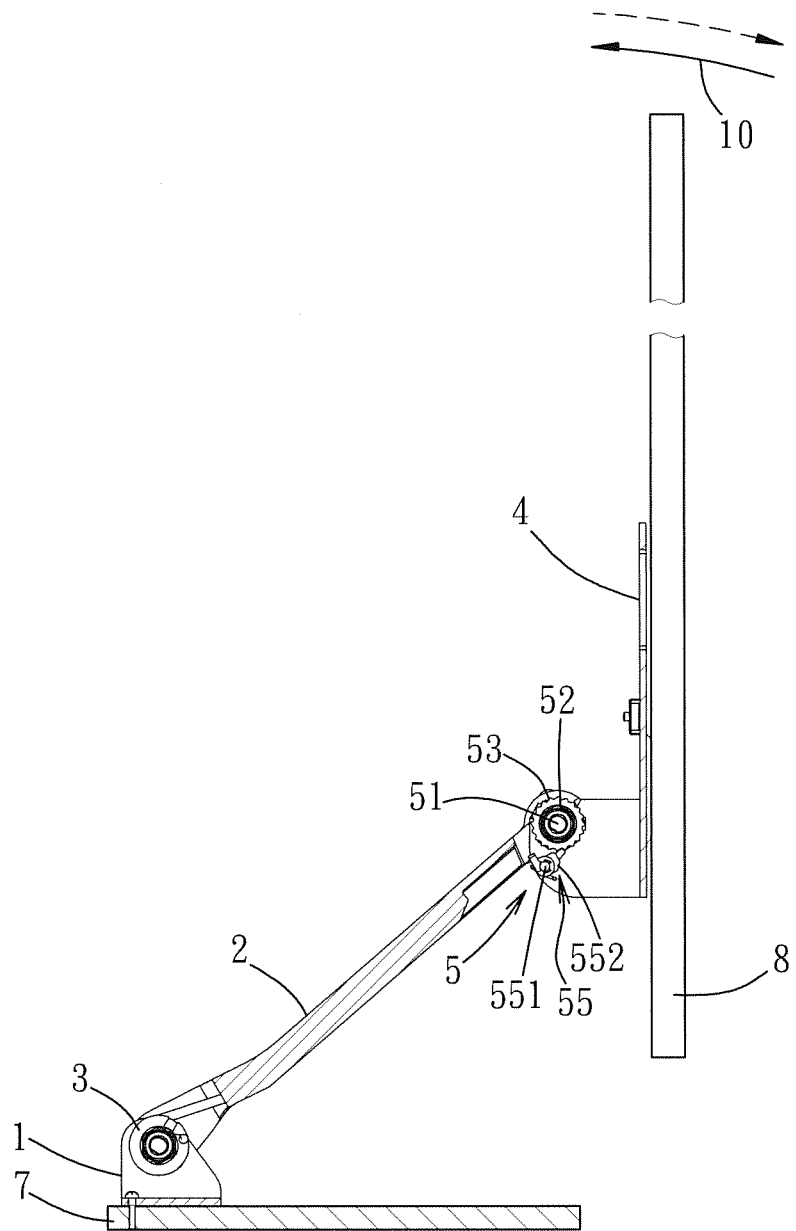
FIG. 6 is a sectional view of the display device of the preferred embodiment taken along line I-I of FIG. 1.
Figure 7:
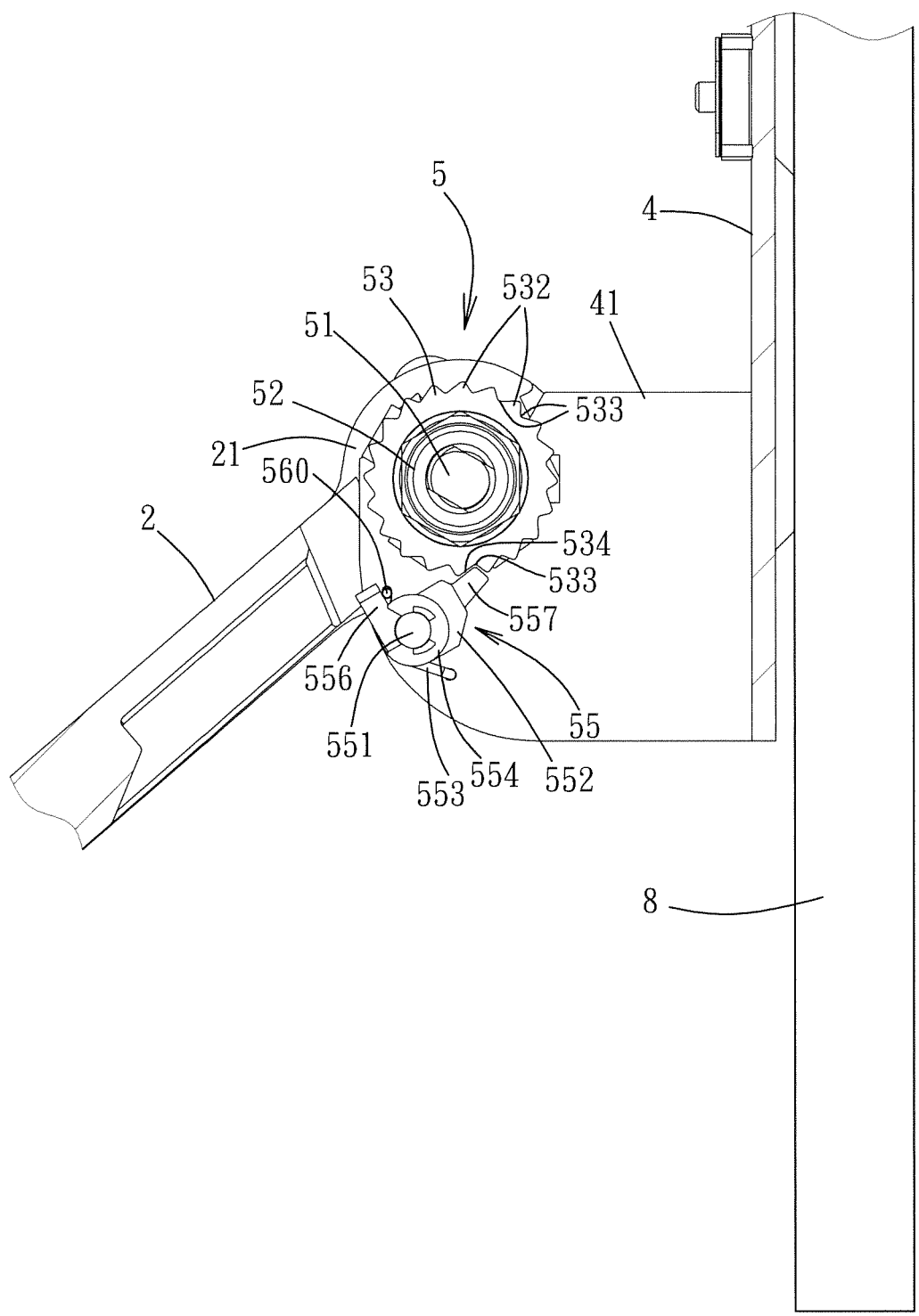
FIG. 7 is a partly enlarged sectional view of FIG. 6, illustrating how a pawl member engages a ratchet.

Referring to FIGS. 6 and 7, in combination with FIGS. 3 and 4, the brake mechanism 55 is disposed on the pivot plate 41, and includes a pawl shaft 551, a pawl member 552, a torsion spring 553 and a retaining member 554. The pawl shaft 551 extends through the pivot plate 41 below the through apertures 413. The pawl member 552 is connected rotatably to the pawl shaft 551 and releasably engages the ratchet 53. The torsion spring 553 is sleeved on the pawl shaft 551 and biases the pawl member 552 into engagement with the ratchet 53. The pawl shaft 551 has one end formed with an annular groove 550. The retaining member 554 is sleeved on the pawl shaft 551 and is engaged to the annular groove 550 to prevent detachment of the pawl member 552 and the torsion spring 553 from the pawl shaft 551. Specifically, the ratchet 53 includes a plurality of inclined teeth 532 formed on an outer periphery thereof, and a plurality of engaging grooves 533 each formed between two adjacent ones of the inclined teeth 532. Each of the inclined teeth 532 has an inclined face 534. The pawl member 552 includes a base 555, two pivot legs 556 extending outwardly and transversely in a same direction from one side of the base 555 and spaced apart from each other in the left-right direction, and an engaging portion 557 extending from the base 555 in a direction opposite to the pivot legs 556. Each pivot leg 556 has an L-shape, and is formed with a pivot hole 558. The pawl shaft 551 extends through the pivot holes 558 in the pivot legs 556. The torsion spring 553 is sleeved on the pawl shaft 551 between the pivot legs 556, and has one end 559 fixed to the pivot plate 41, and the other end 560 abutting against one of the pivot legs 556. The torsion spring 553 biases the pivot legs 556 to rotate in a counterclockwise direction, as shown in FIG. 7, so that the engaging portion 557 can engage a corresponding one of the engaging grooves 553 in the ratchet 53.

With reference to FIG. 4, the pivot plate 41 includes an arc-shaped notch 414 proximate to the second pivot hole 410, and a first stop portion 411 and a second stop portion 412 on two opposite sides of the notch 414. The arc-shaped notch 414 and the through apertures 413 surround the second pivot hole 410. The first and second stop portions 411, 412 are spaced apart from each other in a front-rear direction that is perpendicular to the left-right direction. The first stop portion 411 is proximate to the connecting plate 40. The limiting plate 56 includes a limiting tab 562 projecting from an outer periphery of the limiting plate 56 into the notch 414 between the first and second stop portions 411, 412. In this embodiment, each of the first and second stop portions 411, 412 has an inclined surface. The limiting tab 562 is configured to abut against the first stop portion 411 when the second bracket 4 rotates in a rearward direction 10 (see FIG. 6) so as to restrict a rearward angular movement of the second bracket 4 relative to the first bracket 2, and to abut against the second stop portion 412 when the second bracket 4 rotates in a frontward direction 30 (see FIG. 8) so as to restrict a frontward angular movement of the second bracket 4. The limiting plate 56 is formed with an engaging hole 563 having a non-circular shape that corresponds with that of the shaft body 511. The shaft body 511 extends engagingly through the engaging hole 563 in the limiting plate 56 so that the shaft body 511 and the limiting plate 56 cannot rotate along with the second bracket 4. As such, rotation angle of the second bracket 4 in the frontward and rearward directions can be restricted.

With reference to FIGS. 3 and 5, the spacer 57 is sleeved on the shaft body 511 and extends through the first pivot hole 213 in the pivot lug 21 to prevent friction between the pivot lug 21 and the shaft body 511. In this embodiment, the spacer 57 is a tubular sleeve. However, it is not limited as such. As long as friction between the pivot lug 21 and the shaft body 511 can be prevented, any type of spacers is acceptable in this invention.

With reference to FIGS. 5 to 7, the urging unit 541 biases the ratchet 53 to move toward the pivot plate 41 so that the two friction washers 542 and the ratchet 53 are pressed against the pivot plate 41. One of the stop washers 543 is sandwiched between the pivot plate 41 and the corresponding friction washer 542 at this time. Moreover, by virtue of the biasing force of the torsion spring 553, the engaging portion 557 of the pawl member 552 is firmly engaged to one of the engaging grooves 533 in the ratchet 53 and is prevented from detaching therefrom. Thus, when a user rotates the display module 8 in the rearward direction 10, a force that is exerted by the user on the display module 8 must be greater than the friction between the ratchet 53 and the friction washers 542 so that the pawl member 552 can have a sufficient force to push the ratchet 53 to rotate in the counterclockwise direction, and the second bracket 4 can be successfully rotated relative to the first bracket 2 in the rearward direction 10.

Through the aforesaid configurations, because the frictional force provided by each hinge 5 is large, the second bracket 4 cannot be easily rotated, so that the supporting module 100 can stably position the display module 8 at a selected angular position. Hence, when the user presses the display module 8 with his/her fingers, the display module 8 can remain in a stable state and will not sway or move rearward.

Figure 8:
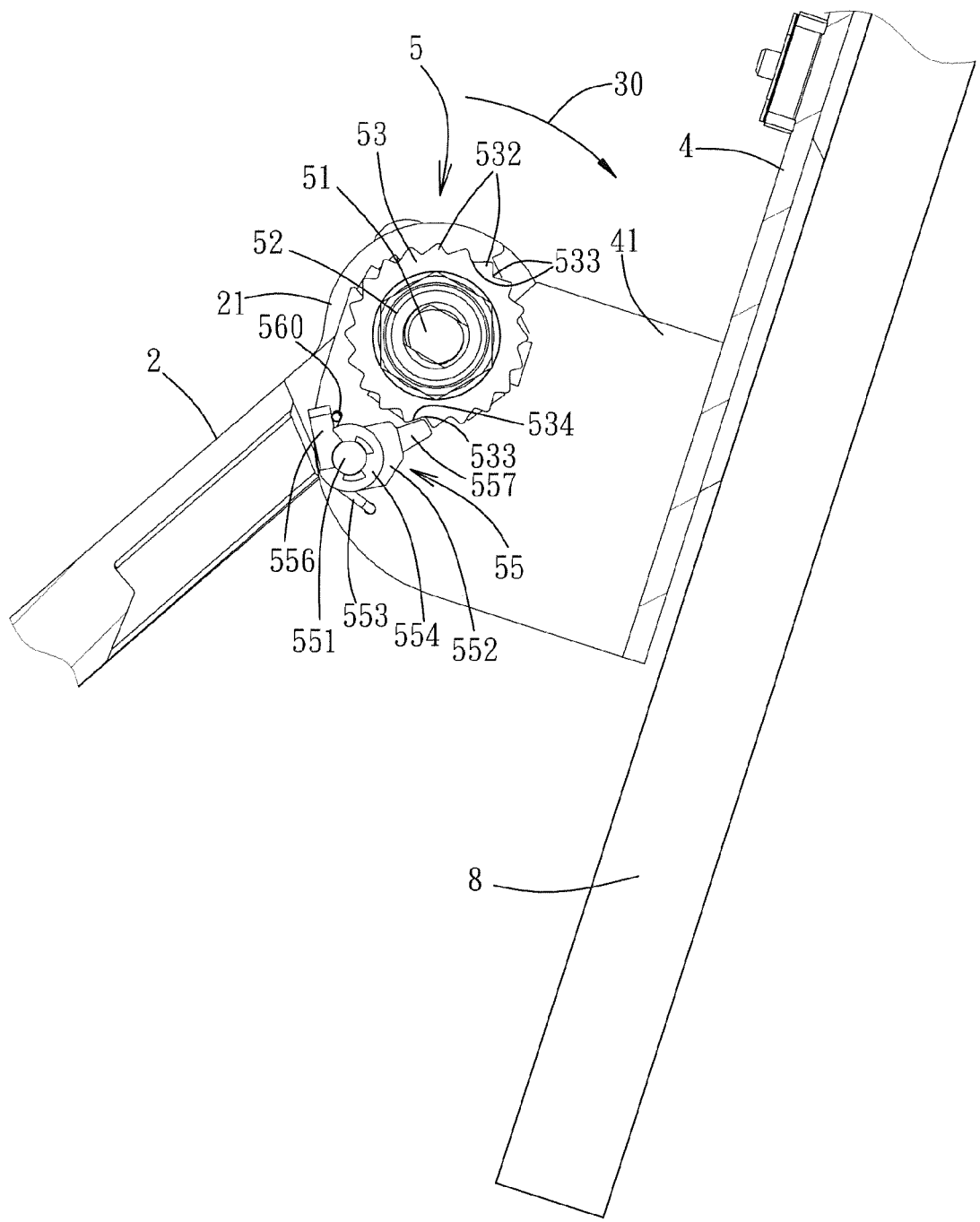
FIG. 8 is a view similar to FIG. 7, but illustrating how rotation of the second bracket in a frontward direction drives relative rotation of the pawl member.

Referring to FIG. 8, in combination with FIG. 7, when the user rotates the display module 8 in the frontward direction 30, the ratchet 53 stays motionless, while the pawl member 552 is driven by the second bracket 4 to rotate therealong in the frontward direction 30 so as to disengage the engaging portion 557 of the pawl member 552 from the corresponding engaging groove 533. The engaging portion 557 of the pawl member 552 can then move along an outer peripheral edge of the ratchet 53 passing over the inclined faces 534 of several inclined teeth 532. After a desired angular position of the display module 8 is reached, the engaging portion 557 of the pawl member 552 is engaged to a corresponding one of the engaging grooves 533 in the ratchet 53 and is positioned thereat. During rotation of the display module 8 and the second bracket 4 in the frontward direction 30, the pawl member 552 does not need to overcome the friction between the ratchet 53 and the friction washers 542. Hence, the user can easily rotate the display module 8 without exerting an excessive force to adjust the angular position thereof and to store the same.

It is worth to mention that although the number of the hinges 5 and the pivots 3 in this embodiment is two for each, in an alternative embodiment, the number for each of the hinges 5 and the pivots 3 may be one.

Moreover, the supporting module 100 in this embodiment may be dispensed with the base bracket 1 and the two pivots 3, and the first bracket 2 thereof may be directly disposed on the base seat 7.

In sum, through the disposition of the ratchet 53 and the pawl member 552, when the display module 8 and the second bracket 4 are rotated in the rearward direction 10, the user must exert a force greater than the frictional force between the ratchet 53 and the friction washers 542 to rotate the ratchet 53 and to successfully rotate the second bracket 4 relative to the first bracket 2 in the rearward direction 10. When the user presses the display module 8 with his/her fingers, the display module 8 is stable and will not sway or move rearward. Further, when the display module 8 and the second bracket 4 are rotated in the frontward direction 30, the pawl member 552 rotates along with the second bracket 4 and disengages from the ratchet 53, and the frictional force provided by each hinge 5 is small. Hence, the user can easily rotate the display module 8 without exerting an excessive force to adjust the angular position thereof and to store the same. Therefore, the objects of this invention are realized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hinge for pivotally interconnecting a first bracket and a second bracket, said hinge comprising:
   a shaft including a shaft body adapted to extend through the first and second brackets in a left-right direction, a head portion formed on one end of said shaft body and adapted to be proximate to the first bracket, and an engaging end portion formed on said shaft body opposite to said head portion and adapted to be proximate to the second bracket, said shaft being adapted to permit rotation of the second bracket relative to the first bracket;
   a fixing member sleeved on said shaft body and connected to said engaging end portion;
   a ratchet sleeved rotatably on said shaft body between said fixing member and the second bracket;
   a friction mechanism including an urging unit that is sleeved on said shaft body between said ratchet and said fixing member and that presses said ratchet toward the second bracket; and
   a brake mechanism adapted to be disposed on the second bracket and including a pawl member releasably engaged to said ratchet;
   wherein said pawl member is adapted to be connected rotatably to the second bracket, said brake mechanism further including a torsion spring that biases said pawl member into engagement with said ratchet.

2. The hinge as claimed in claim 1, wherein said friction mechanism further includes two friction washers sleeved on said shaft body, one of said friction washers being disposed between and abutting against said ratchet and said urging unit, the other one of said friction washers being disposed between and abutting against said ratchet and the second bracket.

3. The hinge as claimed in claim 2, wherein said shaft body has a non-circular cross section, said ratchet being formed with a circular through hole for extension of said shaft body therethrough and being rotatable about said shaft body, each of said friction washers being formed with an engaging hole having a non-circular shape that corresponds to that of said shaft body, said shaft body extending engagingly through said engaging holes in said friction washers.

4. The hinge as claimed in claim 3, wherein said ratchet includes a plurality of inclined teeth provided on an outer periphery thereof, each two adjacent ones of said inclined teeth being formed with an engaging groove, each of said inclined teeth having an inclined face.

5. The hinge as claimed in claim 4, further comprising a limiting plate sleeved on said shaft body between the first and second brackets, the second bracket including a first stop portion and a second stop portion spaced apart from each other in a front-rear direction that is perpendicular to said left-right direction, said limiting plate including a limiting tab disposed between said first and second stop portions, said limiting tab being configured to abut against said first stop portion for restricting a rearward angular movement of the second bracket relative to the first bracket and to abut against said second stop portion for restricting a frontward angular movement of the second bracket relative to the first bracket.

6. The hinge as claimed in claim 5, wherein said limiting plate is formed with an engaging hole having a non-circular shape that corresponds to that of said shaft body, said shaft body extending engagingly through said engaging hole in said limiting plate.

7. The hinge as claimed in claim 6, wherein said friction mechanism further includes two stop washers sleeved on said shaft body and adapted to be connected respectively to two opposite sides of the second bracket, one of said stop washers being disposed between and abutting against one of said friction washers and the second bracket, the other one of said stop washers being disposed between and abutting against said limiting plate and the second bracket.

8. The display device as claimed in claim 7, wherein each of said stop washers includes an engaging tab for engaging the second bracket.

9. The hinge as claimed in claim 1, wherein said brake mechanism further includes a pawl shaft and a retaining member, said pawl shaft being adapted to extend through the second bracket and having an annular groove at one end portion thereof, said pawl member being connected rotatably to said pawl shaft, said torsion spring being sleeved on said pawl shaft, said retaining member being engaged to said annular groove in said pawl shaft to prevent detachment of said pawl member and said torsion spring from said pawl shaft.

10. A supporting module for supporting a display module, said supporting module comprising:
a first bracket including a pivot lug which has opposite first and second sides;
a second bracket adapted to be connected to the display module and having a pivot plate proximate to said pivot lug; and
a hinge pivotally interconnecting said pivot lug of said first bracket and said pivot plate of said second bracket, said hinge including
a shaft including a shaft body extending through said pivot lug of said first bracket and said pivot plate of said second bracket in a left-right direction, a head portion formed on one end of said shaft body and proximate to said pivot lug, and an engaging end portion formed on said shaft body opposite to said head portion and proximate to said pivot plate, said second bracket being rotatable about said shaft relative to said first bracket,
a fixing member sleeved on said shaft body and connected to said engaging end portion,
a ratchet sleeved rotatably on said shaft body between said pivot plate of said second bracket and said fixing member,
a friction mechanism including an urging unit that is sleeved on said shaft body between said ratchet and said fixing member and that presses said ratchet toward said second bracket, and
a brake mechanism disposed on said pivot plate of said second bracket and including a pawl member releasably engaged to said ratchet;
when said second bracket is rotated in a rearward direction relative to said first bracket, said pawl member engages and pushes said ratchet to rotate in said rearward direction; and
when said second bracket is rotated in a frontward direction, said ratchet stays motionless, and said pawl member disengages from said ratchet and moves along an outer peripheral edge of said ratchet.

11. The supporting module as claimed in claim 10, wherein said hinge further includes a spacer sleeved on said shaft body to prevent friction between said first bracket and said shaft body.

12. The supporting module as claimed in claim 11, wherein said first bracket includes two said pivot lugs, said second bracket includes two said pivot plates which are respectively proximate to said pivot lugs, and said supporting module further comprises two said hinges, each of said hinges pivotally interconnecting one of said pivot lugs of said first bracket and a respective one of said pivot plates of said second bracket.

13. The supporting module as claimed in claim 12, further comprising a base bracket, and two pivots interconnecting said base bracket and said first bracket, said first bracket being rotatable about said pivots relative to said base bracket.

14. A display device comprising:
a display module;
a base seat adapted to be disposed on a surface; and
a supporting module disposed between said display module and said base seat to support said display module on said base seat, said supporting module including
a first bracket including a pivot lug having opposite first and second sides,
a second bracket fixed to said display module and including a pivot plate proximate to said pivot lug; and
a hinge pivotally interconnecting said pivot lug of said first bracket and said pivot plate of said second bracket, said hinge including
a shaft including a shaft body extending through said pivot lug of said first bracket and said pivot plate of said second bracket in a left-right direction, a head portion formed on one end of said shaft body and proximate to said pivot lug, and an engaging end portion formed on said shaft body opposite to said head portion and proximate to said pivot plate, said second bracket being rotatable about said shaft relative to said first bracket,
a fixing member sleeved on said shaft body and connected to said engaging end portion,
a ratchet sleeved rotatably on said shaft body between said fixing member and said pivot plate,
a friction mechanism including an urging unit that is sleeved on said shaft body between said ratchet and said fixing member and that presses said ratchet toward said pivot plate, and
a brake mechanism disposed on said pivot plate and including a pawl member releasably engaged to said ratchet;

when said second bracket is rotated in a rearward direction relative to said first bracket, said pawl member engages and pushes said ratchet to rotate in said rearward direction; and when said second bracket is rotated in a frontward direction, said ratchet stays motionless, and said pawl member disengages from said ratchet and moves along an outer peripheral edge of said ratchet.

15. The display device as claimed in claim 14, wherein said supporting module further includes a base bracket fixed to said base seat, and two pivots interconnecting said base bracket and said first bracket, said first bracket being rotatable about said pivots relative to said base bracket.

16. The display device as claimed in claim 15, wherein said first bracket includes two said pivot lugs, said second bracket includes two said pivot plates which are respectively proximate to said second sides of said pivot lugs, and said supporting module further includes two said hinges, each of said hinges pivotally interconnecting one of said pivot lugs of said first bracket and a respective one of said pivot plates of said second bracket.

\* \* \* \* \*